United States Patent [19]

Scholin

[11] 4,011,477
[45] Mar. 8, 1977

[54] APPARATUS USING VARIATIONS IN MAGNETIC FORCE TO RECIPROCATE A LINEAR ACTUATOR

[76] Inventor: Harold W. Scholin, 1125 N. Northwest Highway, Park Ridge, Ill. 60068

[22] Filed: July 19, 1974

[21] Appl. No.: 489,999

[52] U.S. Cl. .................................. 310/80; 310/103
[51] Int. Cl.² .......................................... H02K 7/06
[58] Field of Search ............................. 310/80, 103

[56] References Cited

UNITED STATES PATENTS

| | | | |
|---|---|---|---|
| 2,790,095 | 4/1957 | Peck et al. | 310/103 |
| 2,943,216 | 6/1960 | Spodig | 310/103 |
| 3,831,537 | 8/1974 | Siegel | 310/103 X |

Primary Examiner—Donovan F. Duggan
Attorney, Agent, or Firm—Johnson, Dienner, Emrich & Wagner

[57] ABSTRACT

Apparatus for converting the variations in magnetic force between two magnets, one rotating and one non-rotating, into reciprocating linear motion of an associated device, said apparatus including a motor driven rotatable permanent bar magnet and a non-rotatable permanent bar magnet disposed adjacent thereto and mounted for linear movement, and having an actuator shaft attached thereto, whereby the alternately attracting and repelling magnetic forces between the two magnets are effective to reciprocate the actuator shaft.

4 Claims, 6 Drawing Figures

U.S. Patent  Mar. 8, 1977  4,011,477
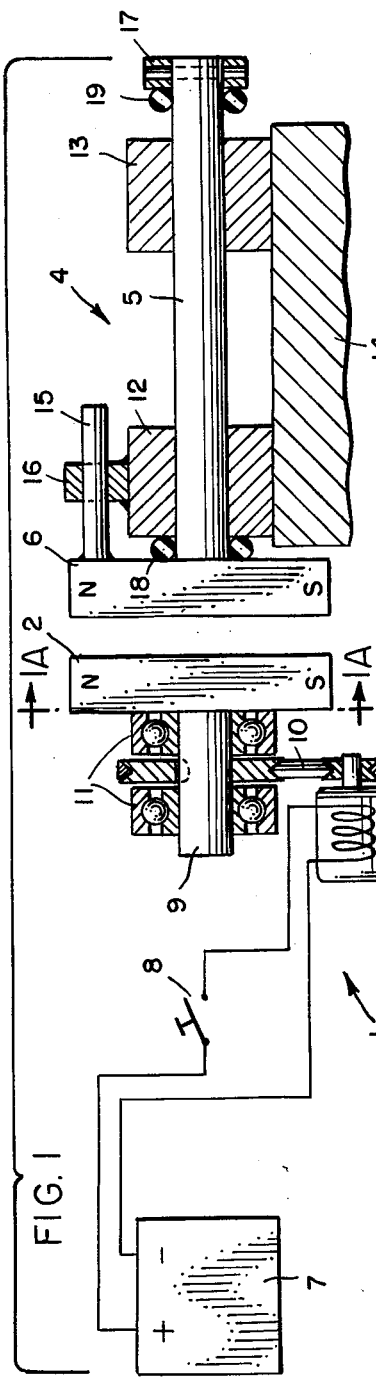
FIG. 1
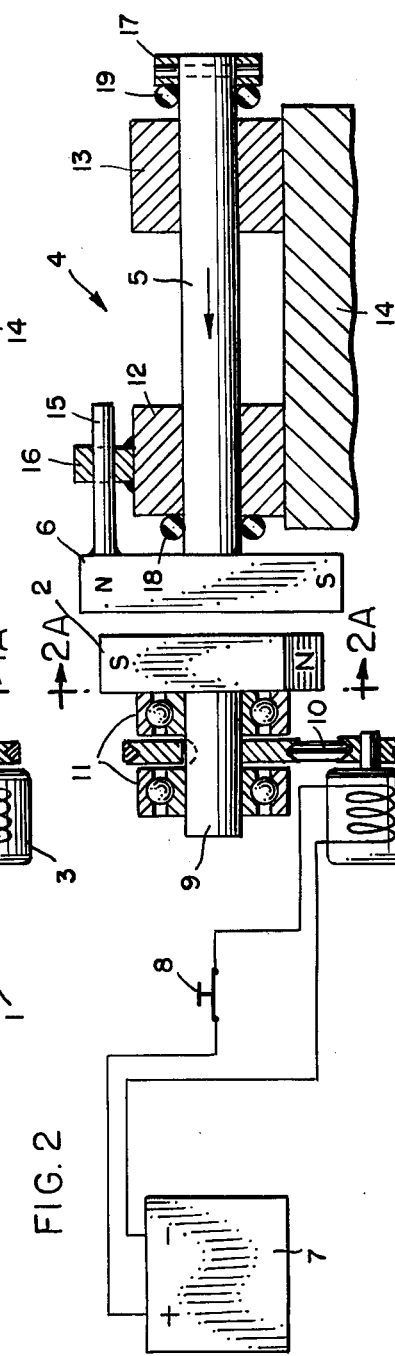
FIG. 2
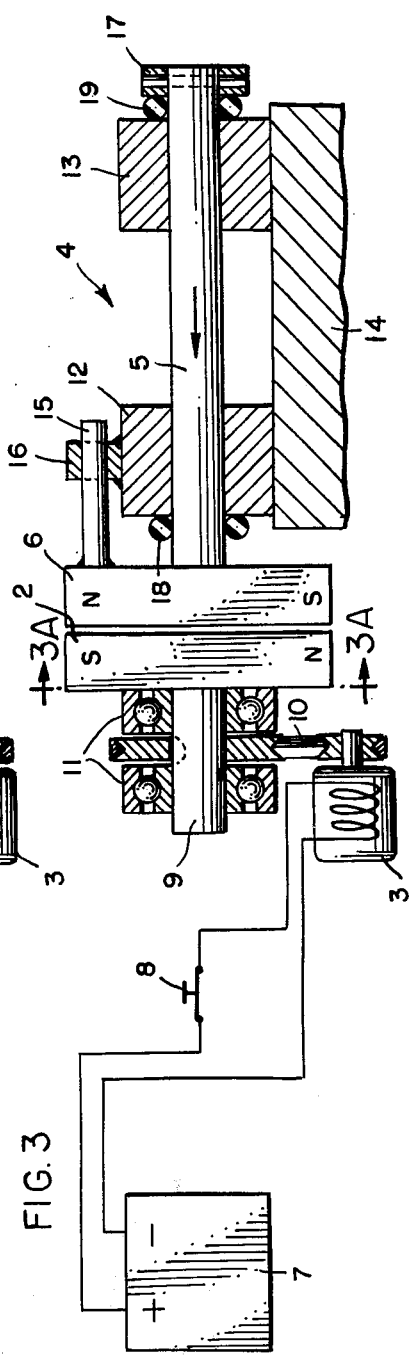
FIG. 3
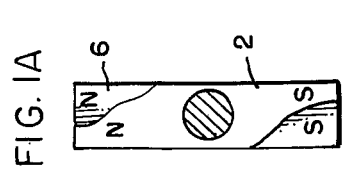
FIG. 1A
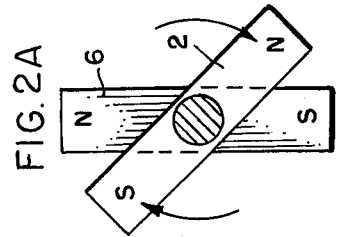
FIG. 2A
FIG. 3A

APPARATUS USING VARIATIONS IN MAGNETIC FORCE TO RECIPROCATE A LINEAR ACTUATOR

BRIEF SUMMARY OF THE INVENTION

This invention relates, generally, to means for converting variations in magnetic force between two magnets into reciprocating linear motion.

An object of the present invention is to utilize the variations in magnetic force between two magnets created by relative rotation thereof, to cause reciprocating motion of an associated member which motion, in turn, may be used to actuate an operatively associated mechanism.

Another object is to provide an apparatus wherein a rotating permanent magnet is used to provide reciprocating movement of a linear actuator by means of the variations in magnetic force resulting from the change in the rotative position of the magnet.

In summary, the apparatus disclosed herein provides means for converting the variations in magnetic force generated by a rotating magnet acting in conjunction with an adjacently disposed non-rotating magnet into a linearly reciprocable motion of an associated actuator. The movement of the actuator may then be transferred to a variety of other devices.

BRIEF DESCRIPTION OF DRAWINGS

FIG. 1 is a view in elevation and partly in section of a device embodying the invention herein and showing the rotating and stationary magnets aligned in a maximum repelling position;

FIG. 1A is a view taken along 1A—1A of FIG. 1;

FIG. 2 is a view similar to FIG. 1 but showing the rotatable magnet in a different position from FIG. 1 and showing the linear actuator moving toward the rotating magnet;

FIG. 2A is a view taken along line 2A—2A of FIG. 2 showing the rotatable magnet and stationary magnet in a relative position approaching a position of maximum attraction;

FIG. 3 also is a view similar to FIG. 1 but showing the linear actuator in its extreme position to the left; and FIG. 3A is a view taken along line 3A—3A of FIG. 3 showing the rotatable magnet and stationary magnet aligned in position of maximum attraction.

DESCRIPTION OF PREFERRED EMBODIMENT

Referring now to the drawings wherein like reference characters designate similar parts, a device for converting variations in magnetic force between two magnets into linear motion of an associated linear actuator device is indicated, generally, by the numeral 1. The latter, in turn, may be operatively connected to a variety of devices such as a cam or eccentric, for example, for actuating the latter in response to the reciprocating linear motion of the linear actuator.

The device 1 includes a first magnet, here shown in the form of a permanent bar magnet 2, a motor 3 for rotating the permanent bar magnet, and a linear actuator assembly 4. The latter includes a longitudinally reciprocable shaft 5 and a second permanent bar magnet 6 attached to said shaft and disposed adjacent said first permanent bar magnet 2.

The motor 3 may be driven from any suitable electrical power source 7, and a switch 8 is provided to connect or disconnect the power source to or from the motor 3. The motor 3 is appropriately mounted to rotatably drive the shaft 9 through a belt and pulley arrangement 10. The shaft may be journaled for rotation in a set of bearings here shown as ball bearing assembly 11 supported on a suitable supporting structure (not shown). The permanent bar magnet 2 is attached at substantially the longitudinal center thereof to one end of the shaft 9 and is disposed in a plane normal thereto as shown in FIG. 1. Obviously the magnet 2 will rotate in a plane normal to the axis of shaft 9 when the latter is rotated. As seen in FIGS. 1 and 1A, one end of the permanent bar magnet 2 has a north polarity and the other a south polarity.

The linear actuator assembly 4 includes the shaft 5 mounted for longitudinal reciprocating movement along its own axis and is slidably supported in a pair of brackets 12 and 13 mounted on a support stand 14. The second permanent bar magnet 6 is attached at substantially the longitudinal center thereof to the left end of the shaft 5 and is disposed closely adjacent the rotatable permanent magnet 2. The opposite ends of magnet 6 are likewise of opposite polarities. Any suitable means may be provided to prevent rotating movement of the shaft 5 and attached magnet 6. The means shown herein for purposes of illustration include a bar member 15 welded to the magnet 6 and extending slidably through a bracket 16 attached to actuator shaft bracket 12. An annular stop member 17 is attached to the end of the shaft 5 to limit the movement of the shaft 5 toward the left.

Cushioning means also is provided on the shaft 5 for cushioning the shaft at each end of its stroke. One such means may be in the form of resilient ring members 18 and 19 attached to the shaft 18 adjacent each end thereof. The resilient ring member 18 is disposed around the shaft 5, adjacent the left end thereof and between the magnet 6 and the bracket 12 and is effective to cushion the end of the stroke of the shaft 5 as it moves to the right. The resilient ring member 19 is disposed around the shaft 5 adjacent the right end thereof and between the bracket 13 and stop member 17 and cushions the end of the stroke of the shaft 5 as it moves to the left.

The operation may be briefly summarized as follows. FIGS. 1 and 1A show rotatable magnet 2 and non-rotatable magnet 6 disposed with their respective north and south poles adjacent each other so that the two magnets in this position repel each other with a maximum of magnetic force, thus forcing shaft 5 as far as possible to the right. Closing of the switch 8 at this position will start rotation of the motor 3 and, consequently, magnet 2. As the magnet 2 moves clockwise to an angular position as illustrated in FIGS. 2 and 2A, the repelling magnetic force between the two magnets 2 and 6 will decrease, and when the bar magnets are substantially at right angles to each other the force changes to an attracting force until the magnets are drawn close to each other as shown in FIGS. 3 and 3A. In this position, the north pole of each magnet is adjacent the south pole of the other magnet. Thus, as magnet 6 has been attracted by rotating magnet 2, the shaft 5 has moved its maximum distance to the left, as seen in FIG. 3. During the next 180° of rotation of shaft 9 and attached magnet 2, the opposite effect takes place, i.e. the magnets tend to increasingly repel each other until the shaft 5 has again shifted to the right a maximum distance, as shown in FIG. 1. Thus, the rotation of magnet 2 sets up alternate repelling and attracting forces which reciprocate shaft 5. The shaft 5 is reciprocated at a rate in direct proportion to the number of rotations of shaft 9 and attached magnet 2.

While the rate of reciprocation of the actuator shaft is presumed to be constant so long as the speed of the motor is constant, it will be apparent that a variable speed motor or a variable speed drive could be used and would be effective to change the rate of reciprocation of the actuator shaft.

It will be appreciated that the use of magnets in which magnetic forces are electrically induced falls within the scope of this invention.

While a preferred embodiment of the invention has been disclosed it should be noted that this is shown by way of example only, and the invention is not to be limited thereto as other variations will be apparent to those skilled in the art and the invention is to be given its fullest possible interpretation within the terms of the following claims.

I claim:

1. An apparatus for converting variations in magnetic force into linear motion of an associated device, the combination comprising:
   a. a first shaft mounted for rotation,
   b. a first elongated permanent bar magnet having the ends thereof of opposite polarity and mounted at substantially the longitudinal center thereof on one end of said first shaft and rotatable therewith,
   c. motor drive means for rotating said first shaft and the magnet mounted thereon,
   d. a second, shaft spaced from said first shaft in axial alignment therewith mounted for linear reciprocating movement in the axial direction thereof and adapted to be associated with a mechanism to be operated thereby,
   e. mounting means for guiding said second shaft in the linear reciprocating movement thereof,
   f. a second elongated permanent bar magnet having the ends thereof of opposite polarity and mounted at substantially the longitudinal center thereof on the end of said second shaft adjacent said first magnet,
   g. means for restraining said second magnet against rotational movement, thereby requiring said second shaft and its magnet to reciprocate only in a linear direction,
   h. said first magnet, when rotated, being effective to alternately repel and attract said second magnet in response to changes in magnetic forces between said magnets, and thereby reciprocate said second shaft.

2. The apparatus as defined in claim 1, wherein said means for restraining said second magnet against rotational movement includes a bar member attached thereto and extending therefrom at a substantially right angle thereto and slidably received within said mounting means.

3. The apparatus as defined in claim 2, wherein said cushioning means comprises resilient members associated with said second shaft and disposed between said second magnet and said mounting means at one end of said second shaft and between said mounting means and a retaining member on the other end of said second shaft.

4. The apparatus of claim 1 including means associated with said second shaft for cushioning the stroke of said second shaft in either direction.

* * * * *